June 30, 1970 P. C. WILMARTH 3,518,482
TELEVISION RECEIVER HORIZONTAL DEFLECTION OUTPUT STAGE PROTECTION CIRCUIT AND DIRECT VOLTAGE SUPPLY
Filed March 14, 1969
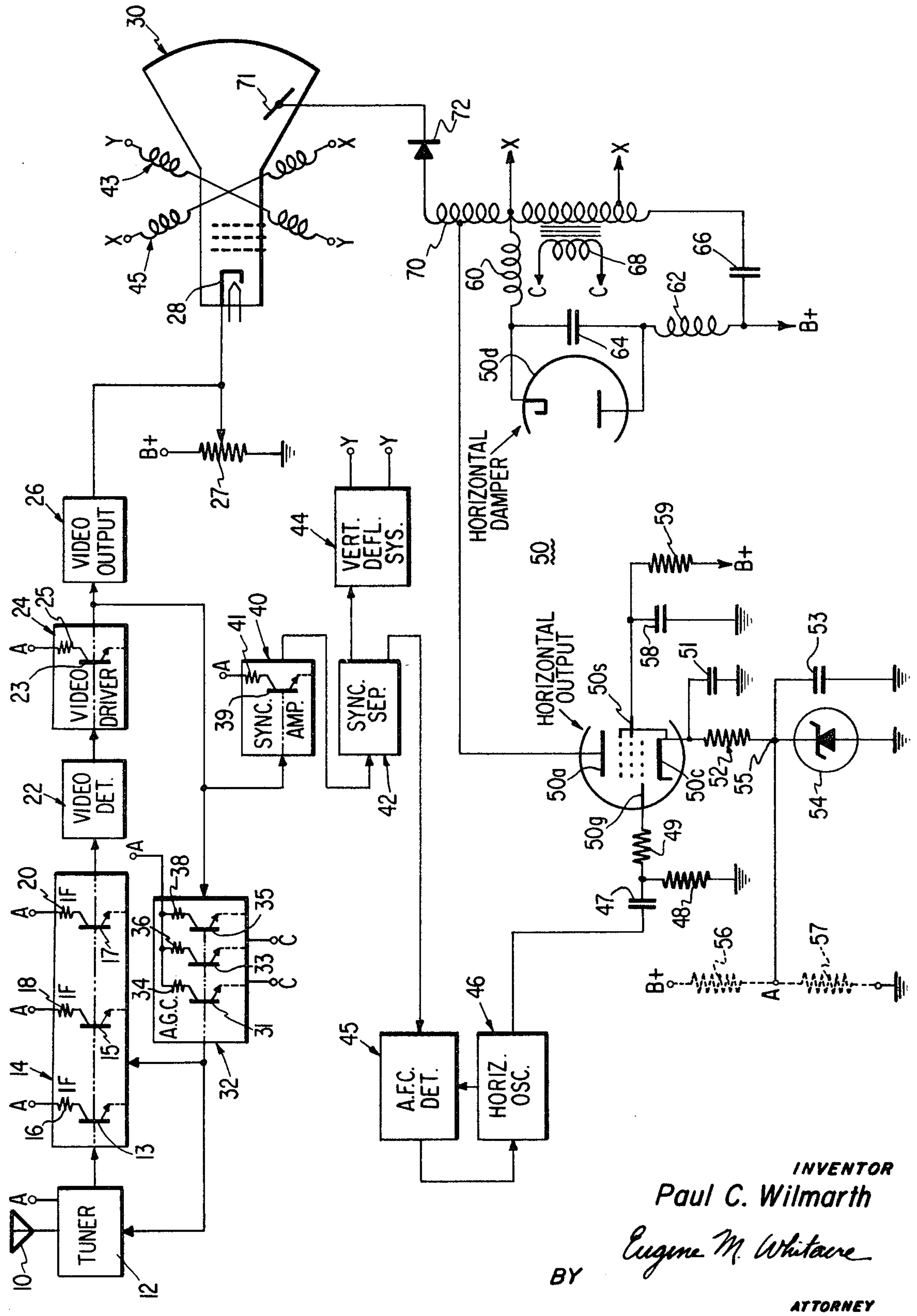
INVENTOR
Paul C. Wilmarth
BY Eugene M. Whitacre
ATTORNEY United States Patent Office 3,518,482
Patented June 30, 1970

3,518,482

TELEVISION RECEIVER HORIZONTAL DEFLECTION OUTPUT STAGE PROTECTION CIRCUIT AND DIRECT VOLTAGE SUPPLY

Paul C. Wilmarth, Indianapolis, Ind., assignor to RCA Corporation, a corporation of Delaware
Filed Mar. 14, 1969, Ser. No. 807,279
Int. Cl. H01j *29/76*
U.S. Cl. 315—27 6 Claims

ABSTRACT OF THE DISCLOSURE

A Zener diode in the cathode circuit of the horizontal deflection output stage of a hybrid television receiver maintains the horizontal deflection output tube anode current at a safe level in the event of loss of input drive signals. The Zener diode also supplies a stabilized direct operating voltage to semiconductor devices in the receiver.

This invention relates to television deflection circuits, and specifically to a protection circuit for the horizontal deflection output stage which also provides a direct supply voltage.

The horizontal deflection output stage not only provides substantial horizontal deflection current, it also customarily provides considerable high voltage power for the picture tube as well as additional signal power for use in horizontal deflection automatic frequency control, automatic gain control, and blanking. To provide the required output current, the horizontal deflection output stage is driven in a manner to cause the control grid to draw current. This grid current serves to provide grid leak biasing which maintains the horizontal output tube anode current within acceptable limits. If, however, the horizontal drive signal source (i.e., horizontal oscillator) fails and, as a result, the grid drive signals and grid leak bias voltage are absent, the resulting high anode current cannot be sustained by the horizontal output tube without failure of the tube or other components.

A problem encountered in hybrid television receivers is that of providing an economical power supply capable of providing the relatively high B+ voltage for vacuum tube stages such as the horizontal deflection output stage, while simultaneously providing the relatively low operating voltage for the transistor stages. One approach in transformerless television receivers is to provide a voltage dropping resistor coupled to the relatively high B+ supply (e.g., 140 volts or greater). Although this method will provide a low operating voltage for the transistors, the resistor dissipates an undesirable amount of power and the consequent generation of heat raises the ambient temperature of the receiver.

When transistors are employed in a compactly designed hybrid receiver excessive heat is undesirable, since, as is well known, the operating characteristics of transistors are substantially dependent upon, and will vary considerably with temperature. High ambient temperatures may also adversely affect other temperature dependent components as well.

A protection circuit for the horizontal deflection output stage of a hybrid television receiver embodying this invention includes a vacuum tube horizontal deflection output stage including a constant voltage regulating device in the cathode circuit of the horizontal output tube to provide a protective bias voltage which limits the horizontal output tube anode current to a safe level. The voltage regulating device also supplies a stabilized low direct voltage for the semiconductor devices in the receiver. A circuit embodying the invention thus solves two unrelated problems: (a) protection for the horizontal output stage; and (b) a stabilized low direct voltage supply not requiring an expensive power dissipating—heat generating voltage dropping resistor.

A consideration of the following description in connection with the attached drawing will afford a better understanding of the invention and its advantages.

The single figure of the drawing illustrates, partially in block form and partially in schematic form, a hybrid television receiver including a plurality of semiconductor stages and a horizontal deflection output stage, constructed in accordance with the present invention.

In the figure, an antenna 10 receives television signals and couples these signals to a tuner 12 which selects the desired radio frequency signals of a predetermined broadcast channel, amplifies such signals, and converts the amplified radio frequency signals to lower intermediate frequency (IF) signals. The output of tuner 12 is coupled to an IF amplifier 14 which amplifiers the intermediate frequency signals. The IF amplifier 14 includes, for example, three transistors 13, 15 and 17 each having a respective collector resistor 16, 18 and 20 coupled to a low direct voltage supply at terminal A. The output of IF amplifier 14 is coupled to a video detector 22 which derives video and synchronization information from the intermediate frequency signals. The output of video detector 22 is coupled to a video driver stage 24. Video driver stage 24 includes a transistor 23 having an associated collector resistor 25 coupled to the low direct voltage supply at terminal A. A sound channel, not shown, may be driven by the video driver stage 24. The output of video driver stage 24 is coupled to a video output stage 26, an automatic gain control stage 32 and a synchronizing signal amplifier stage 40. The video output stage couples amplified video information to a control element such as the cathode 28 of a television kinescope 30. The cathode 28 is also coupled to a brightness control resistor 27 which is coupled between a source of B+ voltage and ground.

Automatic gain control stage 32 includes, for example, three transistors 31, 33, 35 coupled to the low direct voltage supply at terminal A by means of resistors 34, 36 and 38 respectively. The automatic gain control stage 32 operates in a conventional manner to provide gain control to an RF amplifier in tuner 12 and to IF amplifier 14. Synchronizing signal amplifier 40 includes a transistor 39 coupled to the low direct voltage supply at terminal A by means of a collector resistor 41. The output of the sync amplifier 40 is coupled to a sync separator stage 42 which separates the synchronizing information from the video information and also separates the horizontal synchronizing information from the vertical synchronizing information. Vertical synchronizing pulses are coupled to the vertical deflection system 44 which provides deflection current to a vertical deflection winding 43 by means of terminals Y—Y. Horizontal synchronizing pulses are coupled to an automatic frequency control detector 45 which serves to synchronize a horizontal oscillator 46 with the horizontal synchronizing pulses. The output of horizontal oscillator stage 46 is coupled to a control grid 50$g$ of a horizontal deflection output tube 50 by means of a capacitor 47, a grid leak resistor 48, and a resistor 49. A cathode 50$c$ of the horizontal output tube 50 is coupled through a resistor 52, bypassed by a capacitor 51 to a Zener diode 54, bypassed by a capacitor 53, and from the Zener diode 54 to ground. Connecting point 55 may be coupled to a resistor 56 and a resistor 57 as shown, if required, as explained below. A screen grid 50$s$ of horizontal output tube 50 is supplied with operating voltage from the B+ supply by means of a capacitor 58 and resistor 59. The anode 50$a$ of the horizontal output tube 50 is coupled to an output transformer 70, which in conjunction with inductances 60 and 62, capacitances 64 and 66 and a horizontal damper tube 50$d$, provides the necessary voltage waveform at terminals X—X to produce the horizontal deflection current required by a horizontal deflection coil 45 for horizontal scanning of the kinescope 30.

The output transformer 70 is coupled to a high voltage rectifier 72 which, in turn, is coupled to the kinescope aquadag coating at terminal 71. A further winding 68 supplies keying signals to the automatic gain control stage 32 by means of terminals C—C.

Turning now to the operation of the circuit embodying the invention, the horizontal oscillator 46 provides a recurring voltage waveform comprising a relatively slow exponentially increasing portion and a relatively fast decreasing portion which varies, for example, between −75 and +15 volts, the latter occurring at the end of the trace portion of each horizontal deflection cycle. This magnitude of the grid drive or input signal applied to grid 50$g$ is sufficient to cause grid current to flow during a portion of each cycle of the input signal. This grid current charges grid capacitor 47 which, in conjunction with grid leak resistor 48, provided a relatively constant negative direct voltage (e.g., −10 volts) on grid 50$g$ under normal operating conditions. If, however, the input signal is absent, as would occur if the horizontal oscillator 46 failed, no grid current is drawn and capacitor 47 discharges through resistor 48. The voltage at grid 50$g$ is approximately zero with respect to ground. Without additional biasing means, the current flowing through anode 50$a$ could increase to a magnitude which would damage or destroy the horizontal output tube 50 and associated circuitry which includes output transformer 70. In accordance with the present invention, however, resistor 52, Zener diode 54 and capacitors 51 and 53 form an impedance network which provides an additional and a constant bias voltage for horizontal output tube 50 as well as a supply voltage for the transistors coupled to terminal A.

It will be understood that the low voltage terminal A for the IF amplifier 14, the video driver 24, the AGC circuit 32, tuner 12 and the sync amplifier 40 are all connected to the terminal A at the cathode of the Zener diode 54. The impedance network 51–55 is arranged such that as current flows through cathode 50$c$ of the horizontal output tube, the Zener diode 54 conducts in its Zener mode and provides a substantially constant direct voltage at interconnection point 55 (e.g., approximately 12 volts). Thus, whether or not grid drive therefore grid leak bias is present, the Zener diode 54 maintains a positive voltage at point 55 and current flowing through resistor 52 provides an additional positive voltage. Cathode 50$c$ remains positive in relation to the grid, thereby providing a relatively constant minimum bias voltage irrespective of grid drive. This minimum bias voltage constrains anode current in output tube 50 to a safe level, even in the absence of grid drive and supplements grid leak bias in normal operation. Resistor 52 and bypass capacitors 51 and 53 provide filtering action to susbtantially remove horizontal frequency variations in the voltages at the cathode 50$c$ and at point A. The parameters of diode 54 and resistor 52 are chosen to provide the required supply voltage and current at point A with the normal anode current flowing through the horizontal output tube 50. Resistor 56 coupled to a positive voltage source (e.g., B+ can be added to provide additional current if the current demands on the low voltage power supply require. On the other hand, resistor 57 coupled across diode 54 can be added to shunt current not required by the supply.

A preferred embodiment of the present invention includes circuit parameters with the following values:

Kinescope 30—9AEP4 or 240CB4A
Horizontal output and horizontal damper tube 50—33GY7
High voltage rectifier 52—Selenium rectifier SR101 16 kv.
Zener diode 54—12 v. 1 watt
Resistors:
- 27—100,000 ohms
- 48—470,000 ohms
- 52—10 ohms
- 59—10,000 ohms Capacitors:
- 47—.001 microfarad
- 51—100 microfarads
- 53—50 microfarads
- 58—.01 microfarad
- 64—82 microfarads
- 66—.027 microfarad Inductors:
- 60—8.2 microhenry
- 62—8.2 microhenry

What is claimed is:

1. In a hybrid television receiver having a vacuum tube horizontal deflection output stage requiring a first operating voltage source and semiconductor devices requiring a second lower operating voltage source, an electrical circuit comprising:

a source of horizontal drive pulses coupled to a control element of said horizontal deflection output tube;

a grid leak biasing means coupled to said control element and responsive to said horizontal drive pulses for producing at least a portion of the bias voltage required during normal operation;

protective means for limiting anode current flow through said horizontal output tube in the absence of said horizontal drive pulses, said protective means providing supplementary biasing action during normal operation and protective biasing action in the absence of said horizontal drive pulses, said protective means comprising a voltage stabilizing network coupled from a cathode terminal of said horizontal output tube to a reference potential, said voltage stabilizing network providing a relatively constant direct voltage in response to cathode current flowing through said horizontal output tube; and means for coupling said semiconductor devices to said voltage stabilizing network to utilize said relatively constant direct voltage provided by said network as said lower voltage source for said semiconductor devices.

2. A circuit as defined in claim 1 wherein said voltage stabilizing network comprises:

a Zener diode poled to operate in the Zener mode in response to said cathode current flowing through said horizontal output tube.

3. A circuit as defined in claim 2 wherein said voltage stabilizing network further comprises:

capacitive means coupled in parallel with said Zener diode for bypassing horizontal deflection frequencies.

4. A circuit as defined in claim 3 wherein said voltage stabilizing network further comprises:

resistive means serially coupled to said Zener diode, and further capacitive means coupled to said resistive means for bypassing horizontal deflection frequencies.

5. A circuit as defined in claim 1 and further comprising:

resistive means coupled from a relatively high direct voltage supply to said means for coupling said semiconductor devices to said voltage stabilizing network for providing additional current to said semiconductor devices.

6. A circuit as defined in claim 1 and further comprising:

resistive means coupled from said means for coupling said semiconductor devices to said voltage stabilizing network to a reference potential for shunting current not required by said semiconductor devices.

References Cited

UNITED STATES PATENTS 3,271,617 9/1966 Boekhorst ---------- 315—27

RODNEY D. BENNETT, Jr., Primary Examiner

J. G. BAXTER, Assistant Examiner

U.S. Cl. X.R.

307—318; 315—19; 328—9